United States Patent
Zhan et al.

(10) Patent No.: US 11,500,646 B1
(45) Date of Patent: Nov. 15, 2022

(54) TRACKING HETEROGENEOUS OPERATING SYSTEM INSTALLATION STATUS DURING A MANUFACTURING PROCESS

(71) Applicant: Dell Products L.P., Round Rock, TX (US)

(72) Inventors: Daiqian Zhan, Austin, TX (US); Hatim Yousef Amro, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/491,600

(22) Filed: Oct. 1, 2021

(51) Int. Cl.
*G06F 11/00* (2006.01)
*G06F 9/4401* (2018.01)
*G06F 11/07* (2006.01)
*G06F 8/61* (2018.01)

(52) U.S. Cl.
CPC ............ *G06F 9/4403* (2013.01); *G06F 8/61* (2013.01); *G06F 11/0736* (2013.01); *G06F 11/0793* (2013.01)

(58) Field of Classification Search
CPC ............ G06F 11/0736; G06F 11/0793; G06F 11/0703; G06F 11/0706; G06F 11/0796
See application file for complete search history.

(56) References Cited

U.S. PATENT DOCUMENTS 8,086,838 B2    12/2011  Harmer
2019/0095221 A1*  3/2019  Zhan ..................... G06F 9/4408

* cited by examiner

*Primary Examiner* — Katherine Lin
(74) *Attorney, Agent, or Firm* — Terrile, Cannatti & Chambers; Stephen A. Terrile

(57) ABSTRACT

A system, method, and computer-readable medium are disclosed for performing a customer operating system installation operation. The customer operating system installation operation includes performing a customer operating system installation operation onto an information handling system, comprising: performing a customer operating system installation operation; and, performing a UEFI boot entry operation, the UEFI boot entry operation accessing a UEFI boot entry when performing the customer operating system installation operation, the UEFI boot entry operation providing a communication abstraction between a manufacturing operating system and the customer operating system.

16 Claims, 5 Drawing Sheets

TRACKING HETEROGENEOUS OPERATING SYSTEM INSTALLATION STATUS DURING A MANUFACTURING PROCESS

BACKGROUND OF THE INVENTION

Field of the Invention

The present invention relates to information handling systems. More specifically, embodiments of the invention relate to tracking heterogeneous operating system installation status during a manufacturing process.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

A system, method, and computer-readable medium are disclosed for an inter process communication abstraction which provides a simple, common, and reliable solution for performing a customer operating system installation operation.

More specifically, in one embodiment the invention relates to a customer operating system installation operation comprising: performing a customer operating system installation operation onto an information handling system, comprising: performing a customer operating system installation operation; and, performing a UEFI boot entry operation, the UEFI boot entry operation accessing a UEFI boot entry when performing the customer operating system installation operation, the UEFI boot entry operation providing a communication abstraction between a manufacturing operating system and the customer operating system.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: performing a customer operating system installation operation onto an information handling system, comprising: performing a customer operating system installation operation; and, performing a UEFI boot entry operation, the UEFI boot entry operation accessing a UEFI boot entry when performing the customer operating system installation operation, the UEFI boot entry operation providing a communication abstraction between a manufacturing operating system and the customer operating system.

In another embodiment the invention relates to a computer-readable storage medium embodying computer program code, the computer program code comprising computer executable instructions configured for: performing a customer operating system installation operation onto an information handling system, comprising: performing a customer operating system installation operation; and, performing a UEFI boot entry operation, the UEFI boot entry operation accessing a UEFI boot entry when performing the customer operating system installation operation, the UEFI boot entry operation providing a communication abstraction between a manufacturing operating system and the customer operating system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
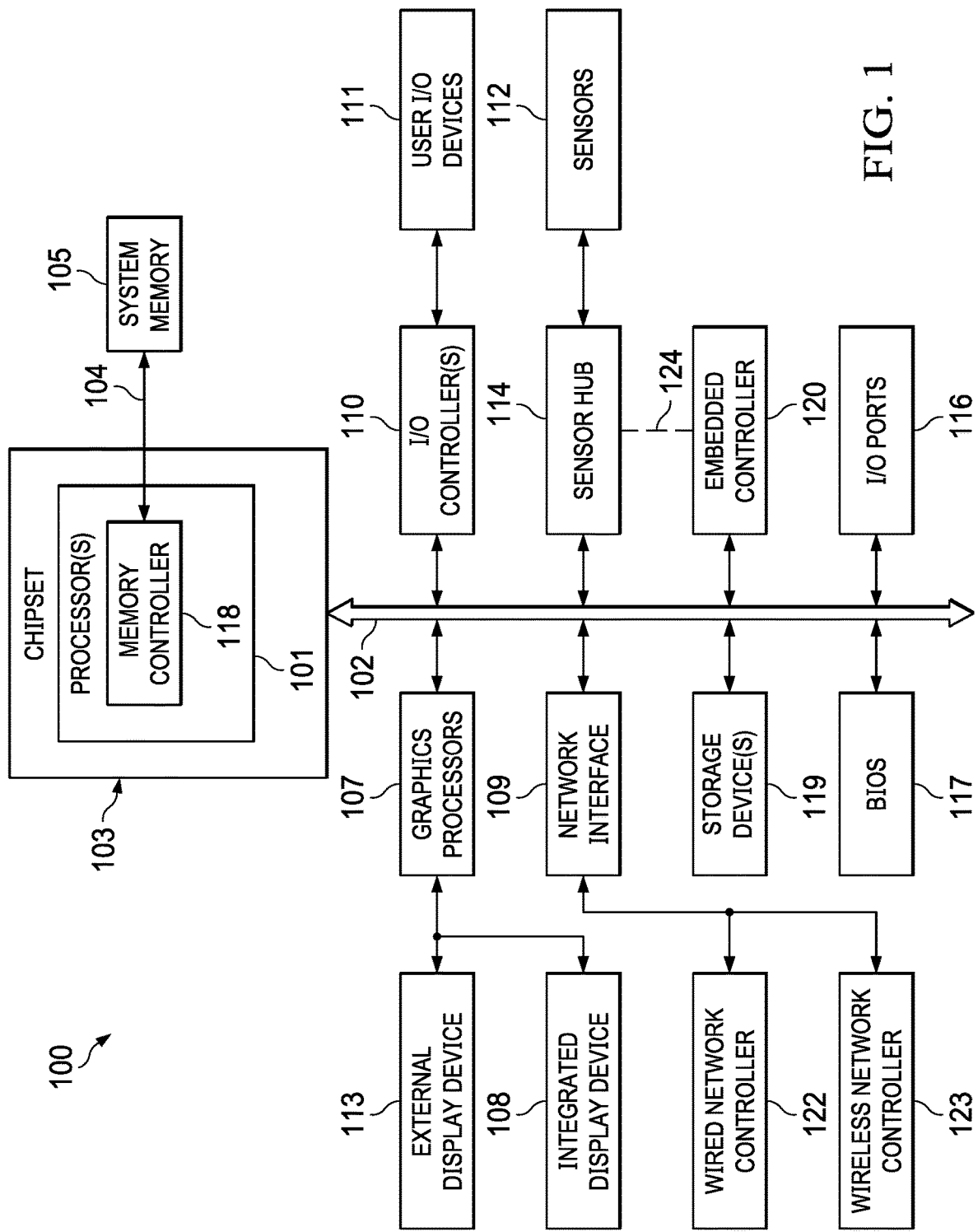
FIG. 1 shows a general illustration of components of an information handling system as implemented in the system and method of the present invention.

Various aspects of the present disclosure include an appreciation that the manufacturing of certain information handling systems include an installation process (often referred to as a manufacturing burn process) which executes under a Windows preinstallation environment (PE) based Operating System (OS) and can support a customer OS software installation onto the system being manufactured (which is often referred to as the System Under Test (SUT). During this part of the manufacturing process the Windows PE Operating System is executing on the system being manufactured. Various aspects of the present disclosure include an appreciation that in addition to Windows customer operating systems, many other types of operating systems are also supported by the manufacturing burn process, such as RedHat, SUSE, Ubuntu, ESXi, etc.

Various aspects of the present disclosure include an appreciation that during one phase of the manufacturing burn process, the System Under Test boots into the customer operating system to allow the operating system software to setup and be verified functional for the hardware specific to that system under test. This phase is referred to as the Fully Integrated System Test (FIST) phase. Once the FIST phase completes, this customer operating system setup process provides a pass or fail signal to indicate the final status of the installation. At this point, the system under test will reboot out of the customer operating system and back to the burn process environment (e.g., the Windows PE environment) to finalize the entire installation process, either to fail the system if an issue is detected or to pass and seal the system for shipment.

Various aspects of the present disclosure include an appreciation that non-Windows customer operating system installations (e.g., Linux or Linux-like) have different file systems and partition schemes. With these different file systems and partition schemes, it can be difficult to provide a consistent method to handshake smoothly between the Windows PE burn process operating system and the customer operating system for the order, specifically for the pass/fail status signaling mechanism from the Customer OS installer.

Various aspects of the present disclosure include an appreciation that a known solution for non-Windows customer operating system installs includes the steps of: finding (or creating) a partition on the system under test's boot drive that is accessible from both the manufacturing and the customer operating system environments (with certain operating systems this can require a FAT/FAT32 partition as the native Linux type partitions (e.g. EXT4) are not supported under the manufacturing operating system environment); creating a temporary process folder on that partition; inserting a flag file (e.g., FIST.ERR or FIST.LOG) via the customer operating system installer into the process folder to signal the customer operating system installation pass/fail status; rebooting the system under test back to the Windows PE burn process operating system (during the reboot process all qualifying partitions on the boot drive are scanned for the presence of the process folder); and checking status/flag file and, if pass, both the flag file and the temporary folder are deleted, after which the system under test continues to run burn process to final completion.

Various aspects of the present disclosure include an appreciation that such a known solution can have a number of potential limitations. For example, many customer operating system programs (e.g., a hypervisor type operating system such as VMWare/ESXi), do not want the factory burn process to access the partitions that have been configured for their customer operating systems, even if just for temporary use. Also, management of the relevant partitions and file requirements across multiple customer operating system environments can be complicated and time consuming. This management often involves specific file allocation table partitions (e.g., FAT/FAT32 partitions) to be pre-defined for different versions of the customer operating systems, e.g., a utility partition for ESXi in FAT format. This results in different status logic contained in the customer operating system installers for the various supported customer operating systems. This management also involves a temporary directory (and flag file) to be created and deleted from the customer partition, which needs to be executed carefully to avoid process data being left on the system as shipped to the customer. Also, certain specific customer operating systems cannot include a Windows PE supported partition and thus may have to skip (often by assuming success) signaling back the pass/fail status. This can require a unique method to communicate the pass/fail status back to the burn process. This communication can require unique support code in the burn process logic to test for that status.

A system, method, and computer-readable medium are disclosed for an inter process communication abstraction which provides a simple, common, and reliable solution for performing a customer operating system installation operation.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116, firmware 117 and an operating system installation system 118. In various embodiments, the firmware 117 includes BIOS. In certain embodiments, the BIOS includes a united extended firmware interface (UEFI) BIOS.

In certain embodiments, the customer operating system installation system 118 may be implemented to perform a customer operating system installation operation. In certain embodiments, the customer operating system installation operation may be performed during operation of an information handling system 100. In various embodiments, performance of the customer operating system installation operation may result in the realization of improved customer operating system installation efficiencies and accuracies, as described in greater detail herein. In certain embodiments, the customer operating system installation operation provides a customer operating system installation which is operating system agnostic. For the purposes of this disclosure, customer operating system agnostic installation may be defined as an installation operation which can be applied to various customer operating systems, including operating systems which do not contain a partition that is supported by a Windows PE operating system. In certain embodiments, the customer operating system installation operation enables tracking of heterogeneous operating system installation status during a manufacturing process. The customer operating system installation operation makes use of a UEFI boot entry operation to provide a communication abstraction between a manufacturing operating system (such as a Windows PE operating system) and a customer operating system.

Figure 2:
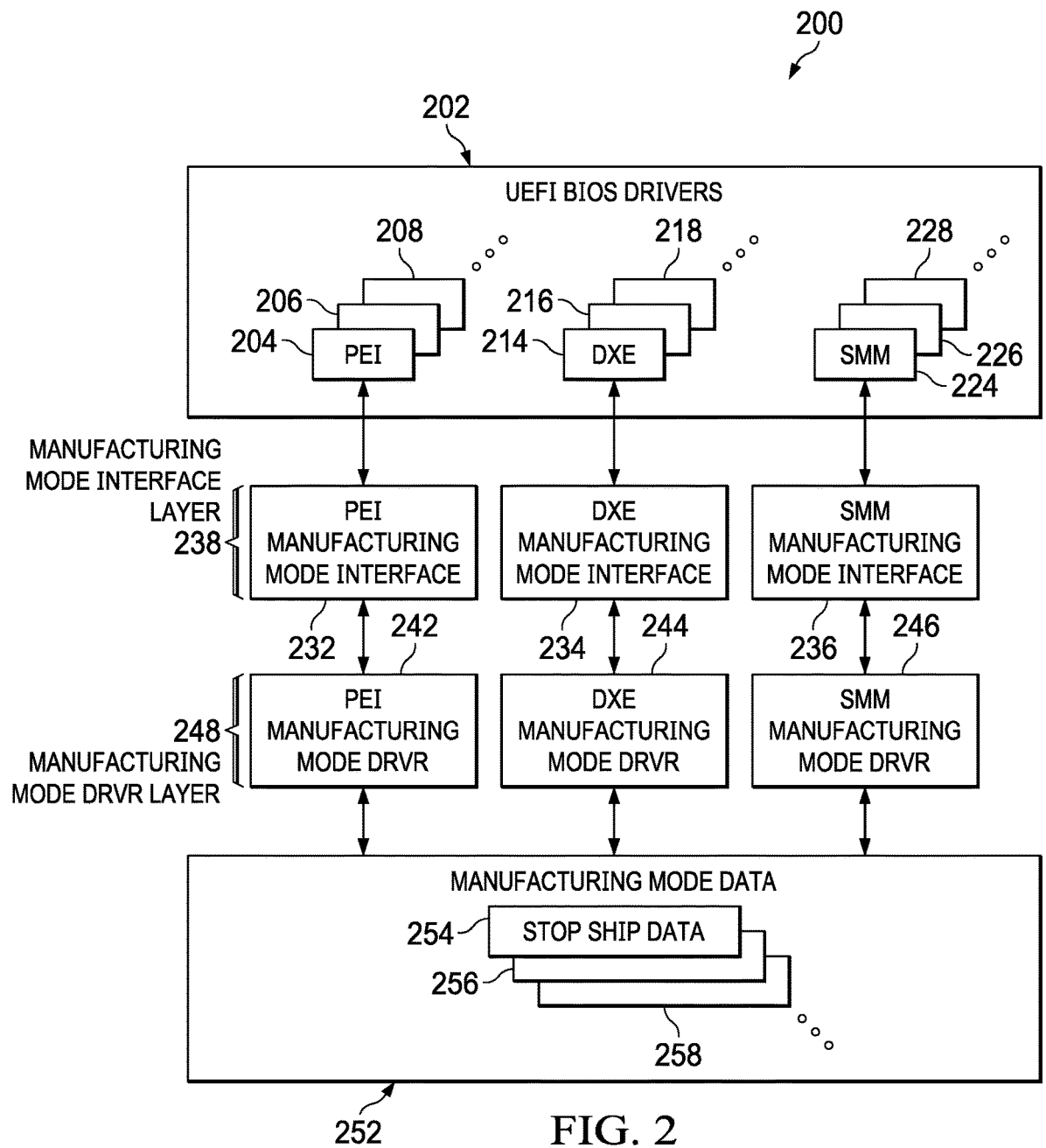
FIG. 2 shows a block diagram of a customer operating system installation environment.

FIG. 2 is a block diagram of a customer operating system installation environment implemented in accordance with an embodiment of the invention. In certain embodiments, the customer operating system installation environment 200 may include a customer operating system installation system 118. In certain embodiments, the operating system installation 118 may be implemented to perform a customer operating system installation operation. In certain embodiments, the operating system installation system 118 may be implemented to include a Pre-FIST phase module 210, a FIST phase module 212, a Post-FIST module 214, or a combination thereof. In certain embodiments, the Pre-FIST phase module 210 performs a Pre-FIST installation operation, the FIST phase module 212 performs a FIST installation operation and the Post-FIST module 214 performs a Post-FIST installation operation.

In certain embodiments, the customer operating system installation environment 200 may include a repository of installation data 220. In certain embodiments, the repository of installation data 220 may be local to the information handling system 100 executing the operating system installation system 118 or may be located remotely. In various embodiments, the repository of installation data 220 may include certain information associated with product data 222, customer operating system data 224, UEFI BIOS installation data 226, and installation result data 228.

In certain embodiments, the customer operating system installation environment 200 may be implemented to include a product configuration system 252 and a product fabrication system 254, or a combination thereof. In certain embodiments, the product fabrication system 254 works in conjunction with the operating system installation system 118 to install a customer operating system onto an information handling system (such as information handling system 100) being fabricated by the product fabrication system 254.

The customer operating system installation operation targets a common attribute among Windows PE, Windows and Linux/Linux-like operating systems environments. Even though Windows and Linux operating systems may not always support the same file systems, all these operating systems support UEFI BIOS. Also, the UEFI boot option management tools of a UEFI BIOS are available for execution under each operating system. In most cases, the manufacturing burn process executes with the BIOS in UEFI boot mode, certainly when servicing a UEFI customer operating system install. This presents the opportunity to make use of the UEFI BIOS itself to signal the customer operating system install pass/fail status back into the Windows PE burn process environment.

This use of a UEFI boot entry to track the operating system install status can be implemented in the manufacturing process in a plurality of scenarios. For example, the UEFI boot entry operation may be used in the manufacturing process prior to customer operating system install (e.g., prior to a FIST operation), may be used during a FIST operation and may be used to check a new pass/fail status (e.g., after a FIST operation).

More specifically, the system under test starts a manufacturing burn process in UEFI mode, as provided to inventory, for example, by the system board vendor. The order requests for a UEFI customer operating system. The system under test is booted to the Windows PE environment to execute the burn process in a UEFI mode of operation. Manufacturing diagnostics and configurations have executed as normal and then the manufacturing process enters a customer operating system software install phase.

When the UEFI boot entry operation is used prior to customer operating system install, the operation clears a new pass/fail status UEFI boot entry, if present. Next, the operation initialized the system under test operating system boot disk with GUID partition table (GPT) partitions and formatting to prepare the system for customer operating system deployment, as normal. The operating system content bits, which include the operating system installer logic, are downloaded onto the initial partitions on the system under test's local boot disk. Next, if an operating system install status UEFI boot entry (such as "OSInstallFail" or "OSInstallPass") is present in the boot options list, the entry is clear (cleaning the entry from possible previous runs). Next, a UEFI boot entry (e.g., "BootOSInstaller") is created with the file path of the customer operating system boot file and set to boot next in BIOS. Next, the system under test is restarted and boots from this entry to start the customer operating system installer and setup (FIST phase).

When the UEFI boot entry operation is used during FIST, at the end of the initial FIST, the operation creates a UEFI boot entry to reflect the operating system install pass/fail status. Next, the system under test is booted into the customer operating system environment to setup the operating system, installed drivers and applications, and run an operating system required test. The operating system installer also creates a particular UEFI boot entry for the customer operating system. In certain embodiments, the particular UEFI boot entry "Vmware ESXi" is created. Next, the operating system install process reports a pass/fail status associated with the install. In certain embodiments, the pass/fail status associated with the install is reported by creating a UEFI boot status entry (e.g., boot entry "OSInstallFail") if any issues were detected during the FIST process or creating a UEFI boot entry (e.g., boot entry "OSInstallPass") if all the installations and setup have passed. Next, the status boot entry is added to the UEFI boot order. In certain embodiments, the status boot entry is added to the bottom of the UEFI boot order.

When the customer operating system install process is complete, the installer moves the customer operating system boot entry to the bottom of the boot order list. This step allows the system under test to boot back to burn process (e.g., Windows PE operating system) from the existing first boot entry (e.g., a preboot execution environment (PXE) boot).

When the UEFI boot entry operation is used to check a new pass/fail status, a pass/fail UEFI boot entry for customer operating system install status is checked. More specifically, after the system under test boots back to the Windows PE burn process environment, the process checks the status of the Customer OS installation by reading the UEFI boot order entries. If only a passing boot entry (e.g., an "OSInstallPass" entry) is present, the FIST is determined as passing. Otherwise, an exception is raised for FIST failure. The system under test is failed (e.g., is presented as a red screen). As part of the final process steps, the UEFI boot options list is cleaned. As part of the cleaning the status boot entry (e.g., the boot entry "OSInstallPass") is deleted. Additionally, as part of the cleaning of the boot entries, the boot entry that was created for initial boot into FIST (e.g., the boot entry "BootOSInstaller") is deleted. Additionally, as part of the cleaning of the boot entries, the customer operating system boot entry (e.g., the "Vmware ESXi" boot entry) is moved to the top of boot order. Finally, as part of the cleaning of the boot entries, flush manufacturing logs are moved to a log server and the system under test is readied for shipment.

The UEFI boot entry operation uses a UEFI boot entry, common to all UEFI OSes, to provide inter process communication between the software installation of a customer operating system which is a different type from the manufacturing operating system. With this UEFI boot entry operation to manage operating system install pass/fail status, the process no longer requires usage of a Windows PE readable partition on the customer operating system disk (where partition types naturally differ between varying customer operating systems). Because a customer operating system partition is no longer used for process status after the customer operating system is installed, the burn process has less impact on the customer operating system space, thereby satisfying the needs of the platform teams and customer operating system install development.

Because the same UEFI boot entry manipulation logic can be supported different customer operating system environments, the manufacturing process is simplified. Special cases for specific customer operating system installs can be eliminated from the manufacturing process, allowing process optimization and deprecation of old and specific code for managing flag files on the customer partitions. Consistency in status method also reduces failure risk to the factory burn process.

In certain embodiments, connection to a remote log server is used to store a status file for FIST pass/fail results, which can remove the limitation requiring tag files to be stored on the customer operating system partition. In certain embodiments, the write of the status file to the remote server originates from within the customer operating system. This operation would not be generic logic easily applied to multiple different customer operating system installers as each installer may have its own capability (or lack of) to use the network and map to a remote server. Also, this operation can require the operation system installer to configure the network interface controllers (NICs) in the customer operating system to be active, which may not be the desire of the development team for that specific customer operating system.

Figure 3A:
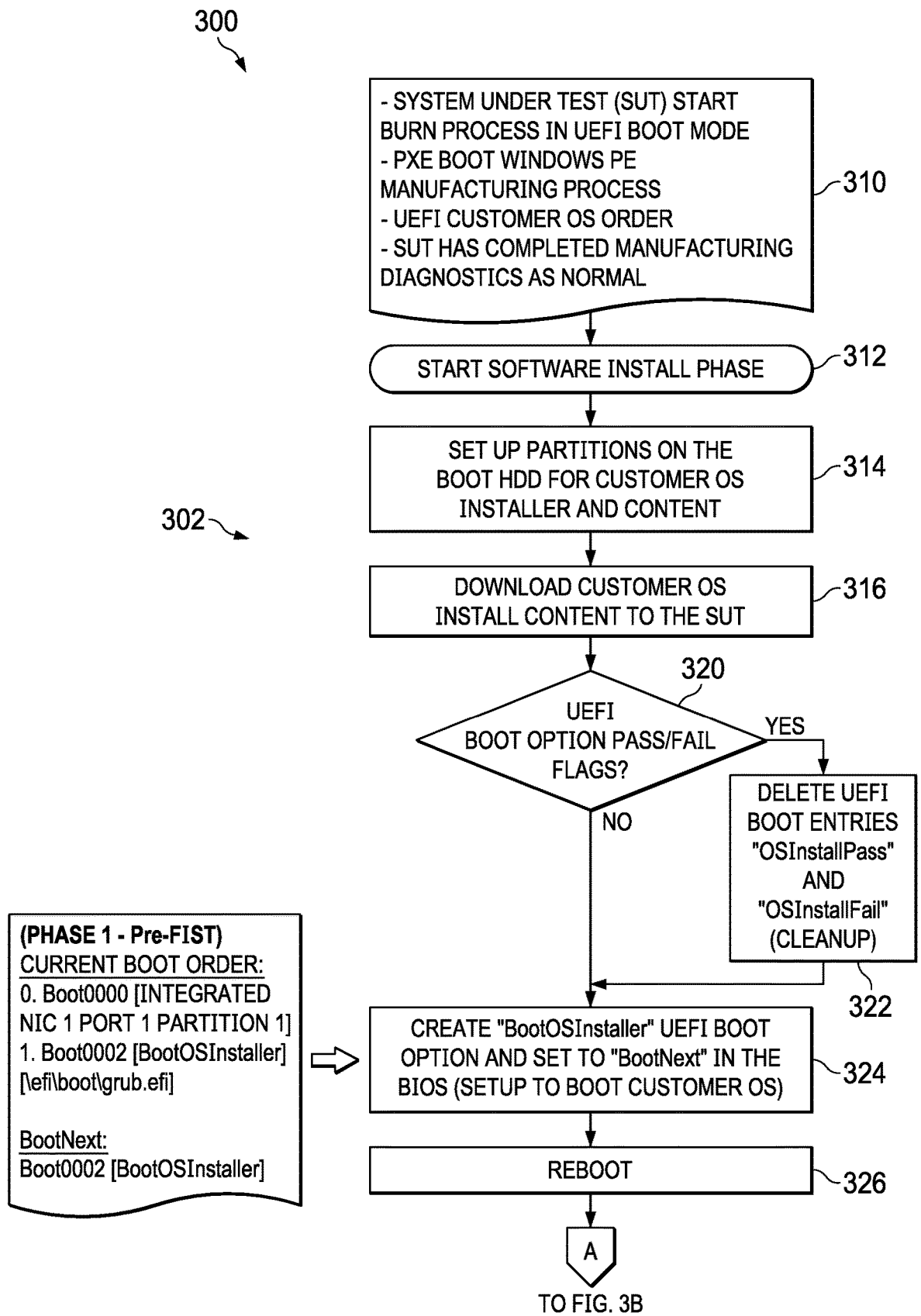
FIGS. 3A and 3B show a flow chart of a customer operating system installation operation 300 during certain installation phases.
Figure 3B:
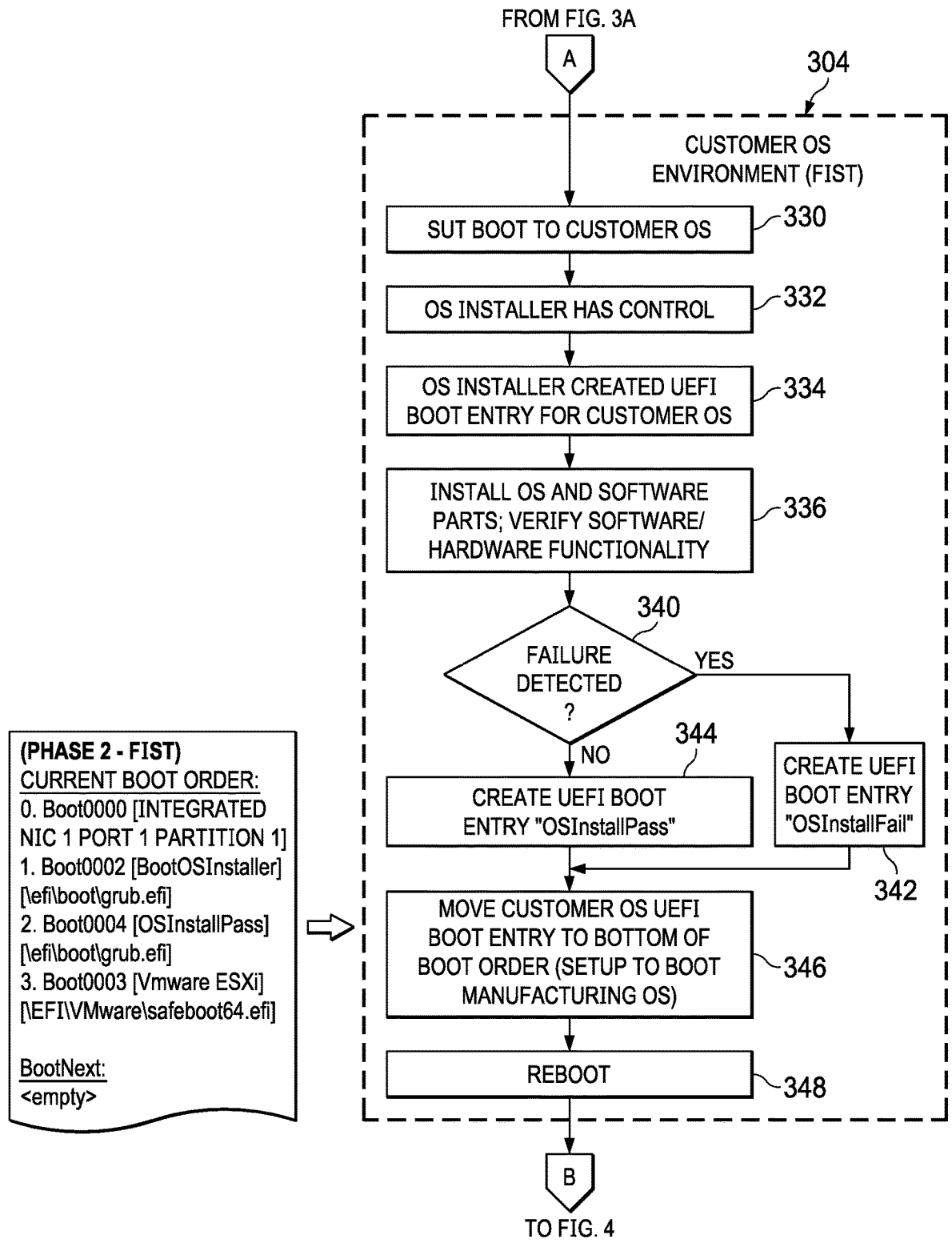

FIGS. 3A and 3B show a flow chart of a customer operating system installation operation 300 during certain installation phases. More specifically, FIG. 3 shows examples of a customer operating system installation operation during a pre-FIST phase 302 and a during FIST phase 304 and specifically examples of how the UEFI boot order and variables look during each phase.

The customer operating system installation operation 300 starts at step 310 with a customer operating system burn process. During the customer operation system burn process the system under test starts the burn process in a UEFI boot mode. In certain embodiments, a NIC/PXE media is the media for the system under test to boot to the Windows PE operating system environment to start the customer operating system installation portion of the manufacturing process. This process is initiated after the system under test has completed hardware manufacturing diagnostics. Next at step 312, the software installation phase is started. Next, the partitions on the boot hard drive for the customer operating system installer and content are configured at step 314. Next, the customer operating system installation content is downloaded to the system under test at step 316.

Next, the customer operating system installation operation 300 checks whether the system under test already contains a customer operating system installation status entry (e.g. either an OSInstallPass or an OSInstallFall entry) in the UEFI boot order list, which is from the possible previous burn at step 320. If any of the entries is present, it gets deleted at step 342. When neither of the entries is present, the operation proceeds directly to step 324. The installation operation 300 then proceeds to step 324 during which creates a UEFI boot entry with the boot file of the customer operating system installer. In certain embodiments, the entry is called "BootOSInstaller". This entry is set to the boot next in BIOS. The system under test will be restarted and will boot from this entry to execute the customer operating system installer. In certain embodiments, before FIST phase the UEFI boot order is configured as: Boot0000 [Integrated NIC1 Port1 Partition 1], Boot002 [BootOSInstaller]. The BootNext variable is set to Boot0002 [BootOSInstaller]. After these configurations are complete, the system under test is rebooted at step 326 and it will start the FIST phase. The customer installation operation 300 then proceeds to the FIST phase 304 by the system under test booting to the customer operating system at step 330. Next, at step 332, control is passed to the operating system installer. Next, at step 334 the customer operating system installer creates a UEFI boot entry for the customer operating system. The customer operating system and particular customer operating system parts are installed at step 336. During this installation, the software/hardware functionality of the customer operating system is verified.

At step 340 the operation 300 determines whether a failure was detected during the verification. If a failure is detected, then the operation creates a UEFI failure boot entry (e.g., an OSIstallFail boot entry) at step 342. If no failure is detected, then the operation creates a UEFI pass boot entry (e.g., an OSInstallPass boot entry) at step 344. In either case, the operation proceeds to move the customer operating system UEFI boot entry to the bottom of the boot order at step 346. Thus, the system is configured to boot to the manufacturing operating system as the first UEFI boot entry points to the initial boot media that is capable of booting the manufacturing operation system. For example, in certain embodiments, during the FIST phase, the UEFI boot order is configured as: Boot0000[Integrated NIC1 Port1 Partition 1], Boot002[BootOSInstaller], Boot0004 [OSInstallPass], Boot0003 [Vmware ESXi]. The BootNext UEFI boot variable is configured as empty. Next, at step 348, the FIST phase 302 completes with the system under test being rebooted and the operation proceeds to the post-FIST phase (see e.g., FIG. 4).

Figure 4:
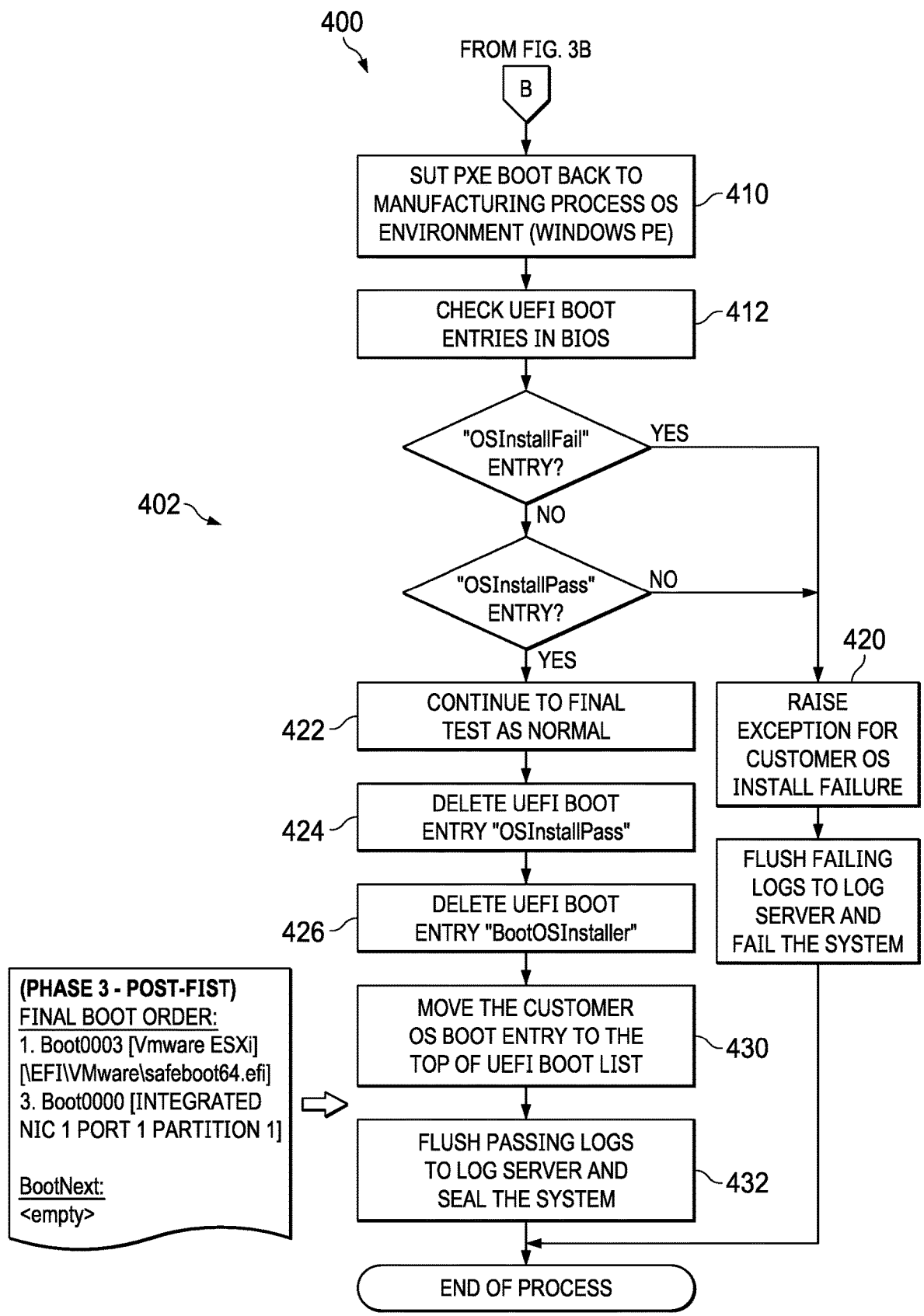
FIG. 4 shows a flow chart of a customer operating system installation operating 400 during an installation phase.

FIG. 4 shows a flow chart of a customer operating system installation operating 400 during an installation phase. More specifically, FIG. 4 shows a customer operating system installation operation during a POST-FIST phase, and specifically shows how a customer operating system install status boot entry is checked and then cleaned during this phase.

The customer operating system installation operation 400 starts at step 410 with the system under test PXE booting back to the manufacturing process operating system environment. Next, the operation checks for UEFI boot entries in BIOS at step 412. Next, the operation 400 determines whether a fail UEFI boot entry is present (e.g., an OSInstallFail entry). If there is not a system fail entry, then the operation 400 determines whether a pass UEFI boot entry is present (e.g., an OSInstallPass entry). If there is a fail UEFI boot entry present or if there is not a pass entry present, then the operation proceeds to raise an exception indicating that there is a customer operating system failure at step 420. If there is a pass UEFI boot entry present, then the operation 400 proceeds to continue to a final test operation at step 422. Next, at step 424, the operation 400 deletes the UEFI pass boot entry, and at step 426 deletes the UEFI boot installer entry (e.g., the BootOSInstaller entry).

Next at step 430, the operation moves the customer operating system boot entry to the top of the UEFI boot list. At step 432, the operation 400 flushes the passing logs to a log server and seals the system for delivery and the operation ends. For example, in certain embodiments, during the Post-FIST phase, the UEFI boot order is configured as: Boot0003 [Vmware ESXi] and Boot0000 [Integrated NIC1 Port1 Partition 1]. The BootNext variable is configured as empty.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a customer operating system installation operation onto an information handling system, comprising:

performing a customer operating system installation operation;

performing a UEFI boot entry operation, the UEFI boot entry operation accessing a UEFI boot entry when performing the customer operating system installation operation, the UEFI boot entry operation providing a communication abstraction between a manufacturing operating system and the customer operating system; and wherein the customer operating system installation operation includes a pre Fully Integrated System Test (pre-FIST) operation; and, the UEFI boot entry operation determines whether a UEFI boot entry is present.

2. A computer-implementable method for performing a customer operating system installation operation onto an information handling system, comprising:

performing a customer operating system installation operation;

performing a UEFI boot entry operation, the UEFI boot entry operation accessing a UEFI boot entry when performing the customer operating system installation operation, the UEFI boot entry operation providing a communication abstraction between a manufacturing operating system and the customer operating system; and wherein the customer operating system installation operation includes a Fully Integrated System Test (FIST) operation; and, the UEFI boot entry operation creates a UEFI boot entry based upon whether an installation failure is detected.

3. A computer-implementable method for performing a customer operating system installation operation onto an information handling system, comprising:
performing a customer operating system installation operation;
performing a UEFI boot entry operation, the UEFI boot entry operation accessing a UEFI boot entry when performing the customer operating system installation operation, the UEFI boot entry operation providing a communication abstraction between a manufacturing operating system and the customer operating system; and wherein
the customer operating system installation operation includes a post Fully Integrated System Test (post-FIST) operation; and,
the UEFI boot entry operation determines whether a UEFI boot entry is present during performance of the customer operating system installation operation.

4. The method of claim 3, wherein:
the UEFI boot entry operation determines whether the UEFI boot entry includes one of a UEFI fail boot entry and a UEFI pass boot entry.

5. The method of claim 4, wherein:
when the UEFI boot entry includes a UEFI pass boot entry, the customer operating system installation operation proceeds to completion; and,
the UEFI pass boot entry is removed from the BIOS.

6. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
performing a customer operating system installation operation;
performing a UEFI boot entry operation, the UEFI boot entry operation accessing a UEFI boot entry when performing the customer operating system installation operation, the UEFI boot entry operation providing a communication abstraction between a manufacturing operating system and the customer operating system; and wherein
the customer operating system installation operation includes a pre Fully Integrated System Test (pre-FIST) operation; and,
the UEFI boot entry operation determines whether a UEFI boot entry is present.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
performing a customer operating system installation operation;
performing a UEFI boot entry operation, the UEFI boot entry operation accessing a UEFI boot entry when performing the customer operating system installation operation, the UEFI boot entry operation providing a communication abstraction between a manufacturing operating system and the customer operating system; and wherein
the customer operating system installation operation includes a Fully Integrated System Test (FIST) operation; and,
the UEFI boot entry operation creates a UEFI boot entry based upon whether an installation failure is detected.

8. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
performing a customer operating system installation operation;
performing a UEFI boot entry operation, the UEFI boot entry operation accessing a UEFI boot entry when performing the customer operating system installation operation, the UEFI boot entry operation providing a communication abstraction between a manufacturing operating system and the customer operating system; and wherein
the customer operating system installation operation includes a post Fully Integrated System Test (post-FIST) operation; and,
the UEFI boot entry operation determines whether a UEFI boot entry is present during performance of the customer operating system installation operation.

9. The system of claim 8, wherein:
the UEFI boot entry operation determines whether the UEFI boot entry includes one of a UEFI fail boot entry and a UEFI pass boot entry.

10. The system of claim 9, wherein:
when the UEFI boot entry includes a UEFI pass boot entry, the customer operating system installation operation proceeds to completion; and,
the UEFI pass boot entry is removed from the BIOS.

11. A non-transitory, computer-readable storage medium embodying computer program code, the computer program code comprising computer executable instructions configured for:
performing a customer operating system installation operation;
performing a UEFI boot entry operation, the UEFI boot entry operation accessing a UEFI boot entry when performing the customer operating system installation operation, the UEFI boot entry operation providing a communication abstraction between a manufacturing operating system and the customer operating system; and wherein
the customer operating system installation operation includes a pre Fully Integrated System Test (pre-FIST) operation; and,
the UEFI boot entry operation determines whether a UEFI boot entry is present.

12. A non-transitory, computer-readable storage medium embodying computer program code, the computer program code comprising computer executable instructions configured for:

performing a customer operating system installation operation;

performing a UEFI boot entry operation, the UEFI boot entry operation accessing a UEFI boot entry when performing the customer operating system installation operation, the UEFI boot entry operation providing a communication abstraction between a manufacturing operating system and the customer operating system; and wherein the customer operating system installation operation includes a Fully Integrated System Test (FIST) operation; and, the UEFI boot entry operation creates a UEFI boot entry based upon whether an installation failure is detected.

13. A non-transitory, computer-readable storage medium embodying computer program code, the computer program code comprising computer executable instructions configured for:

performing a customer operating system installation operation;

performing a UEFI boot entry operation, the UEFI boot entry operation accessing a UEFI boot entry when performing the customer operating system installation operation, the UEFI boot entry operation providing a communication abstraction between a manufacturing operating system and the customer operating system; and wherein the customer operating system installation operation includes a post Fully Integrated System Test (post-FIST) operation; and, the UEFI boot entry operation determines whether a UEFI boot entry is present during performance of the customer operating system installation operation.

14. The non-transitory, computer-readable storage medium of claim 13, wherein:

the UEFI boot entry operation determines whether the UEFI boot entry includes one of a UEFI fail boot entry and a UEFI pass boot entry.

15. The non-transitory, computer-readable storage medium of claim 14, wherein:

when the UEFI boot entry includes a UEFI pass boot entry, the customer operating system installation operation proceeds to completion; and, the UEFI pass boot entry is removed from the BIOS.

16. The non-transitory, computer-readable storage medium of claim 11, wherein:

the computer executable instructions are deployable to a client system from a server system at a remote location.

* * * * *